(12) United States Patent
Shapira et al.

(10) Patent No.: US 12,222,735 B2
(45) Date of Patent: Feb. 11, 2025

(54) SYSTEMS, METHODS AND PROGRAMS FOR CONTINUOUSLY DIRECTING AN UNMANNED VEHICLE TO AN ENVIRONMENT AGNOSTIC DESTINATION MARKED BY A USER

(71) Applicant: XTEND REALITY EXPANSION LTD., Tel Aviv (IL)

(72) Inventors: Matteo Shapira, Tel-aviv (IL); Aviv Shapira, Tel-aviv (IL); Adir Tubi, Beer Yaacov (IL); Rubi Liani, Rosh Haayin (IL); Erez Nehama, Ramat Gan (IL)

(73) Assignee: XTEND REALITY EXPANSION LTD., Tel Aviv (IL)

( * ) Notice: Subject to any disclaimer, the term of this patent is extended or adjusted under 35 U.S.C. 154(b) by 103 days.

(21) Appl. No.: 17/424,532

(22) PCT Filed: Jan. 24, 2020

(86) PCT No.: PCT/IL2020/050096
§ 371 (c)(1),
(2) Date: Jul. 21, 2021

(87) PCT Pub. No.: WO2020/152687
PCT Pub. Date: Jul. 30, 2020

(65) Prior Publication Data
US 2022/0075370 A1    Mar. 10, 2022

Related U.S. Application Data

(60) Provisional application No. 62/796,337, filed on Jan. 24, 2019, provisional application No. 62/818,132, filed on Mar. 14, 2019.

(51) Int. Cl.
G05D 1/224    (2024.01)
G05D 1/00    (2006.01)
(Continued)

(52) U.S. Cl.
CPC ........ G05D 1/2247 (2024.01); G05D 1/0038 (2013.01); G05D 1/101 (2013.01);
(Continued)

(58) Field of Classification Search
None
See application file for complete search history.

(56) References Cited

U.S. PATENT DOCUMENTS

| 2013/0156307 A1* | 6/2013 | Yates | G06V 10/143 |
| | | | 382/165 |
| 2016/0004303 A1* | 1/2016 | Arar | G06F 3/013 |
| | | | 345/156 |

(Continued)

OTHER PUBLICATIONS

Kwok Kit Lau and B. E. Shi, "A 1-D local image velocity sensor using Gabor filtering," 2000 IEEE International Symposium on Circuits and Systems (ISCAS), Geneva, Switzerland, 2000, pp. 423-426 vol. 1, (Year: 2000).*

*Primary Examiner* — Tuan C To
*Assistant Examiner* — David Ruben Pedersen
(74) *Attorney, Agent, or Firm* — The IP Law Firm of Guy Levi, LLC

(57) ABSTRACT

The disclosure relates to systems, methods and programs for maneuvering unmanned vehicles. More specifically, the disclosure relates to systems, methods and programs for controlling maneuverability of unmanned vehicles (ground, aerial and marine) by coupling vehicle controls with point of regard (PoR) in a 2D plane, translated to a continuously updating flight vector in a 3D space, based on 12 DOF head pose and/or hand gesture of a user.

19 Claims, 5 Drawing Sheets

(51) Int. Cl.
*G05D 1/24* (2024.01)
*G06T 7/73* (2017.01)
*B64U 101/30* (2023.01)

(52) U.S. Cl.
CPC ............... *G05D 1/24* (2024.01); *G06T 7/73* (2017.01); *B64U 2101/30* (2023.01); *B64U 2201/20* (2023.01); *G06T 2207/10032* (2013.01)

(56) References Cited

U.S. PATENT DOCUMENTS

| | | | | |
|---|---|---|---|---|
| 2017/0038405 A1* | 2/2017 | Zhou | ................... | G06V 10/454 |
| 2017/0168507 A1* | 6/2017 | Paduano | ................ | G06Q 50/28 |
| 2018/0130017 A1* | 5/2018 | Gupte | ................... | G01N 33/00 |
| 2020/0379487 A1* | 12/2020 | Iwase | .................. | G08G 5/0078 |

* cited by examiner

SYSTEMS, METHODS AND PROGRAMS FOR CONTINUOUSLY DIRECTING AN UNMANNED VEHICLE TO AN ENVIRONMENT AGNOSTIC DESTINATION MARKED BY A USER

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods and programs for maneuvering unmanned vehicles. More specifically, the disclosure is directed to systems, methods and programs for controlling maneuverability of unmanned vehicles (ground, aerial and marine) by coupling vehicle controls with point of regard (PoR) in a 2D plane, translated to a continuously updating flight vector in a (real) 3D space, which may exist in any variable, simple or complex, indoor or outdoor environments.

Currently, control over unmanned vehicles (aerial (e.g., a drone), ground, marine, submersibles) generally consists of two "opposing" approaches. The extreme manual approach/first person view (FPV) approach; whereby, FPVs drones are flown using an RC radio with two sticks that control thrust, pitch, yaw, and roll. These are extremely tough to master (for example, to move forward—One needs to thrust the drone supposedly upwards and pitch it forward slightly to produce forward motion), and take months to years to harness the skills. The second approach is the consumer drone flight approach which also use an RC (two sticks) solution (or matching "app" on a smartphone) to control the motion of the drone, but eliminate the difficulties of direct yaw/pitch/roll control. This method is cumbersome, and does not enable intuitive and/or accurate flight to specific point in space in simple or complex environments, let alone achieve immersive flight experience.

These and other shortcomings of the existing technology are sought to be resolved herein.

SUMMARY

Disclosed, in various exemplary implementations, are systems, methods and programs for maneuvering unmanned vehicles. More specifically, disclosed herein are exemplary implementations of systems, methods and programs for controlling maneuverability of unmanned vehicles (ground, aerial and marine) by coupling vehicle controls with point of regard (PoR) in a 2D plane, translated to a continuously updating flight vector in a 3D space. Furthermore, the flight vector in (real) 3D space may exist in any variable, simple or complex, indoor or outdoor environments.

In an exemplary implementation provided herein is a system for directing an unmanned vehicle to a destination marked by a user comprising: a display module; an unmanned vehicle (UXV) comprising an imaging module, in communication with the display module; a human-machine interface (HMI) module in communication with the display module; and a central processing module (CPM), in communication with the display module, the UXV, the HMI module, and a processor, wherein the processor is in communication with a non-volatile memory comprising a processor-readable media having thereon a set of executable instructions, configured, when executed, to cause the processor to: using the HMI module, detect a destination marked by the user on the display module; develop a route plan for the UXV toward the destination in a three dimensional physical space; and maneuver the UXV to the marked destination in the 3D physical space.

These and other features of the systems, methods and programs for controlling maneuverability of unmanned vehicles (ground, aerial and marine) by coupling vehicle controls with point of regard (PoR) in a 2D plane, translated to a continuously updating flight vector in a 3D space, will become apparent from the following detailed description when read in conjunction with the figures and examples, which are exemplary, not limiting.

BRIEF DESCRIPTION OF THE FIGURES

For a better understanding of systems, methods and programs for controlling maneuverability of UXVs, with regard to the exemplary implementations thereof, reference is made to the accompanying examples and figures, in which.

DETAILED DESCRIPTION

Provided herein are exemplary implementations of systems, methods and programs for controlling maneuverability of unmanned vehicles (ground, aerial and marine) by coupling vehicle controls with point of regard (PoR) in a 2D plane, translated to a continuously updating flight vector in a 3D space. The flight vector in (real) 3D space may exist in any variable, simple or complex, indoor or outdoor environments.

The disclosed technology allows for an intuitive and immersive flight experience, making the user feel a "telepresence" of actually being in another location, or additionally and alternatively, by marking a destination on a flat display panel The systems, methods and programs disclosed herein further allow for an extremely easy and very precise flight, the operation of which can be learned in seconds versus months. The systems, methods and programs disclosed herein also allow to integrate the intuitive nature of the control with extremely fast and maneuverable drones (UAV). For example, the consumer industry standard is averaged on 20-40 KM/H, while with the disclosed systems, 300 KM/hr. in an outdoor environment, is achievable without losing precision while simultaneously minimizing the effects of physical velocity such as drift velocity. The disclosed approach leverages the user as a "human sensor"; meaning utilizing the full cognition and visual prowess of the human brain to assist in the assessments of flight. Specifically, the disclosed systems, methods and programs draw upon the user's hand/eye coordination, and gaze correction to assist in imparting an easy & correct flight pattern.

In general, the system comprises of a self-propelled unmanned vehicle (UXV)—Which may refer to ground, underground, submersible, marine, and aerial machine both outdoor and indoor which has the capability to physically travel in space (2D-flat surface such as ground vehicles, or marine vehicles; and 3D environments). The system is sized, adapted and configured to be able to continually compare the location of the UXV in physical space to the predetermined "virtual" vector configured to reach the precise point in space requested by the user via proprietary sensor fusion algorithms that allow the UXV to estimate the UXV's temporospatial position with great accuracy in variable indoor and outdoor environments.

Figure 1:
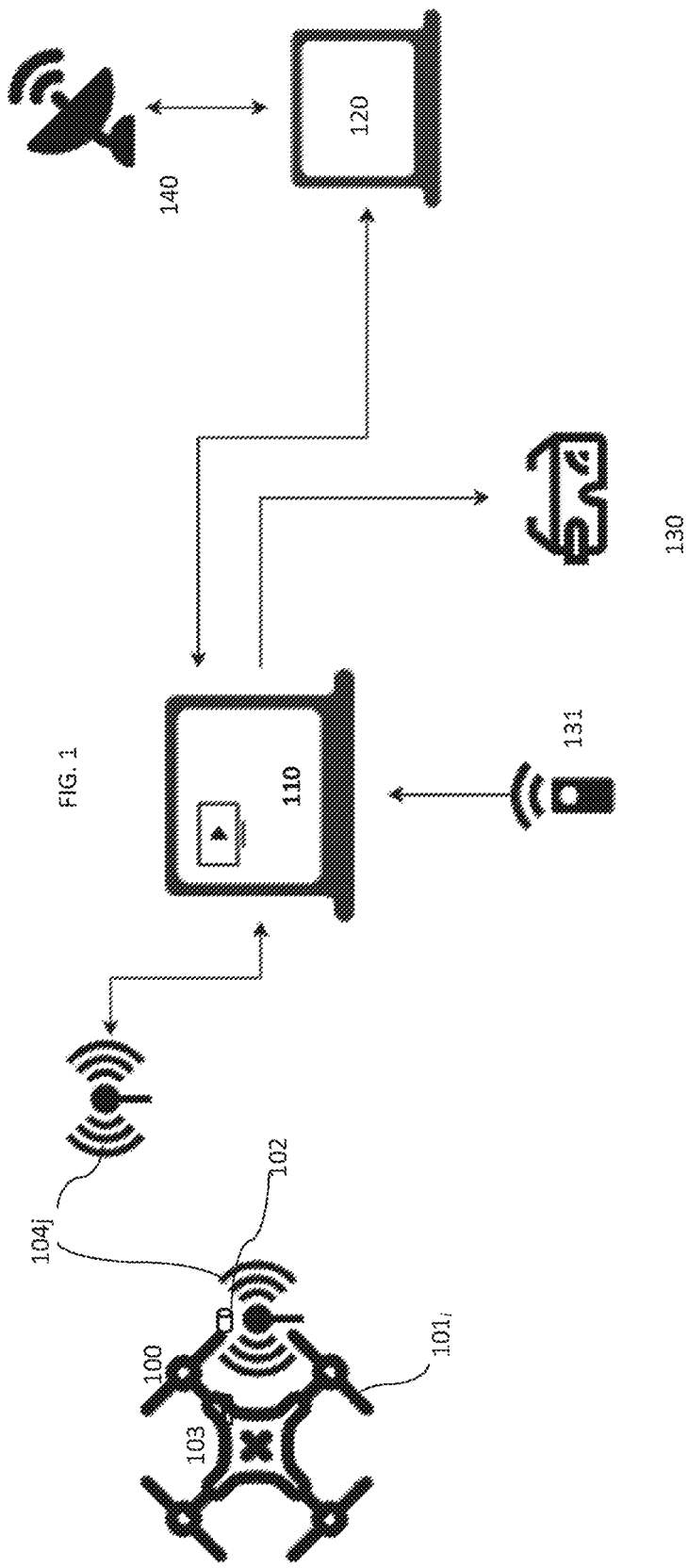
FIG. 1, illustrates a schematic of the system's components.

Accordingly and in an exemplary implementation illustrated schematically for UAVs in FIG. 1, provided herein is system 10 for directing an unmanned vehicle 100 to a destination marked by a user comprising: display module 110; unmanned vehicle (UXV) 100 comprising imaging module 102, in communication with display module 110; human-machine interface (HMI) module 130, in communication with display module 110; and central processing module (CPM, used interchangeably herein with the term ground control station (GCS)) 120, in communication with display module 110, UXV 100, HMI module 130, and controller 131 and at least one processor, wherein the at least one processor is in communication with non-volatile memory comprising a processor-readable media having thereon set of executable instructions, configured, when executed, to cause the at least one processor to: using HMI module 130, detect destination marked by user on display module using controller 131; develop route plan for UXV toward destination in three dimensional physical space; and maneuver UXV to marked destination in 3D physical space. UXV, for example UAV (e.g., Drone) can further comprise sensor array 101 as well as transceivers 104*j*, configured to maintain two-way communication between UAV 100, and at least one of: display module 110, CPM (i.e. GCS) 120, and HMI 130 (as well as controller 131). Sensor array 101$_i$ can comprise a 12 degrees of freedom (DOF) sensor reference platform, pressure gauge(s), accelerometers, Lidars, ToF, Sonars, Accelerometers, Gyros, GPS, MonoCam SLAM, StereoCam SLAM, and any use of computer vision algorithms based on raster-based visual collection devices (e.g. cameras) onboard the UXV 100, and a sensor array combination comprising one or more of the foregoing.

It is noted that the term "imaging module" whether as coupled to display module 110, or on board UXV 100, and as used herein refers a unit that includes a plurality of built-in image and/or optic sensors and outputs electrical signals, which have been obtained through photoelectric conversion, as an image, while the term "module" refers to software, hardware, for example, a processor, or a combination thereof that is programmed with instructions for carrying an algorithm or method. The modules described herein may communicate through a wired connection, for example, a hard-wired connections, a local area network, or the modules may communicate wirelessly. The imaging module may comprise charge coupled devices (CCDs), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the subject's face. The cameras used in the imaging modules of the systems and methods disclosed, can be a digital camera. The term "digital camera" refers in an exemplary implementation to a digital still camera, a digital video recorder that can capture a still image of an object and the like. The digital camera can comprise an image capturing unit or module, a capture controlling module, a processing unit (which can be the same or separate from the central processing module).

Imaging module 102 can also be configured to transmit video feed to either display module 110, or CPM 120. The video feed can be used, with other points along the vector (see e.g., FIG. 5) to determine optical flow, thus adding to the persistent maintenance of the flight plan. Moreover, the imaging module can comprise video cameras, configured to transmit at the format commensurate with local standard, for example, NTSC, PAL, or as encoded and encrypted packets. The video can be transmitted using radio frequency, or if intended for indoor use, using Bluetooth, ZigBee, or cellular networks provided the structure is equipped with the proper beacons. In an exemplary implementation, the video encoding can have a format of H.264, H.265, MPEG, and the like.

Figure 4:
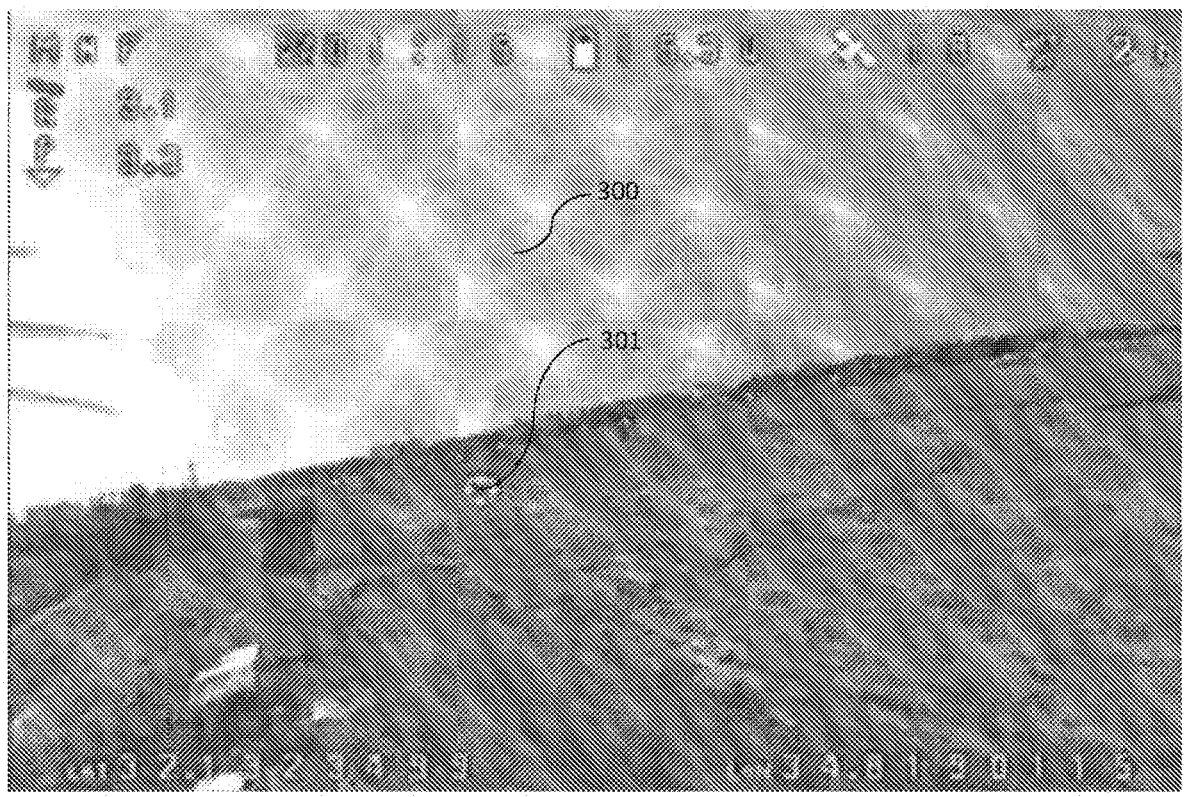
FIG. 4, illustrates location of the PoR (marked destination) on the user's display module.

Likewise, both display module 110 and CPM 120 may further comprise a user interface module, whereby, "user interface module" broadly refers to any visual, graphical, tactile, audible, sensory, or other means of providing information to and/or receiving information from the user or other entity. For example, a set of instructions which enable presenting a graphical user interface (GUI) on display module 110 to a user for displaying and changing and or inputting data associated with a data object (e.g., HMI 130, and/or user controller 131, or marking the UAV's destination) in data fields. In an exemplary implementation, the user interface module is capable of displaying any data that it reads from imaging module 102, UXV 100, CPM 120, or display module 110. As illustrated in FIG. 4, showing the location of the PoR (marked destination) on the user's display module. This marked destination can be changed dynamically with the use of user controller 131, while the system will adjust flight controls to accommodate the changes made in the PoR location.

In certain implementations, the user interface module is capable of displaying any data that it reads from imaging module 102 (see e.g., FIG. 1). In addition, the term 'module', as used herein, means, but is not limited to, a software or hardware component, such as a Field Programmable Gate-Array (FPGA) or Application-Specific Integrated Circuit (ASIC), which performs certain tasks.

HMI 130, and controller 131 is configured to utilize a dynamic approach to enable the operator to maximize their potential for controlling UXV 100 in a use specific manner. This per-use case—For example, in order to maximize the "Sky Defense" application (the use of UAVs to protect a specified airspace), HMI 130 can be configured to have various high-end features such as automated target tracking that may be easily turned on/off by the operator and enables an efficient way of achieving the result—In this case a successful and efficient interception. As illustrated, HMI module can be a wearable computing device, e.g, glasses 130, helmet, and/or a remote controller. also illustrated in FIG. 1, is radar/detection station 140, in communication with GCS 120, for example, to provide pulse position modulation and/or pulse width modulation from operator controller 131, for example a mobile computing device such as a smartphone. HMI 130, and operator controller 131, together with display module (interchangeable with operator/pilot station (see e.g., FIG. 2) 110, allows an almost universal (in other words, not a professional pilot) ability to operate an unmanned vehicle with extreme precision (as defined in one exemplary implementation by the raster resolution of the interface), at precise speeds (from very low 0.54 knots (1 kph) to very fast—162 knots (300 kph)).

Figure 2:
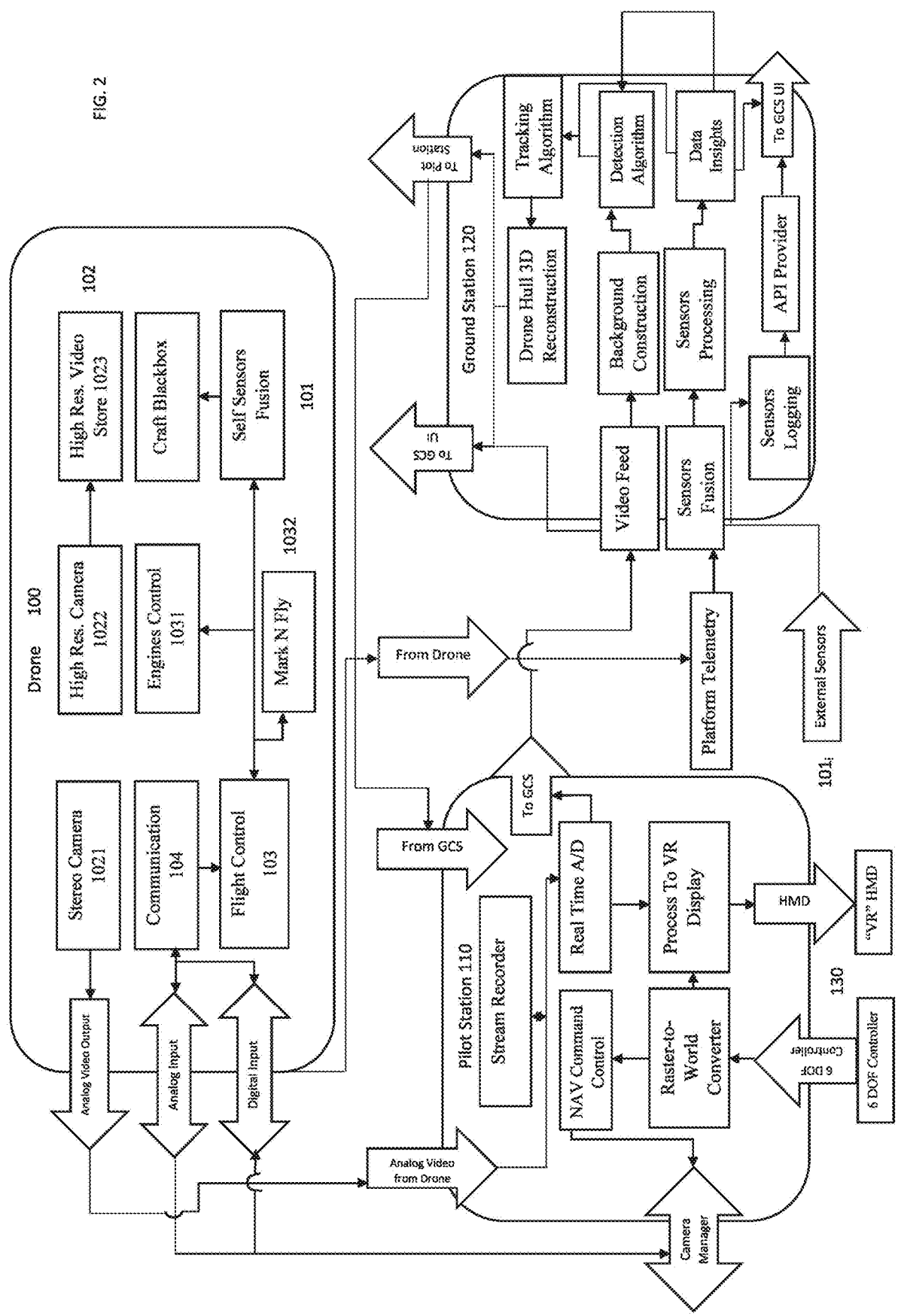
FIG. 2, illustrates the systems architecture showing an exemplary implementation of possible information flow throughout the system.
Figure 3:
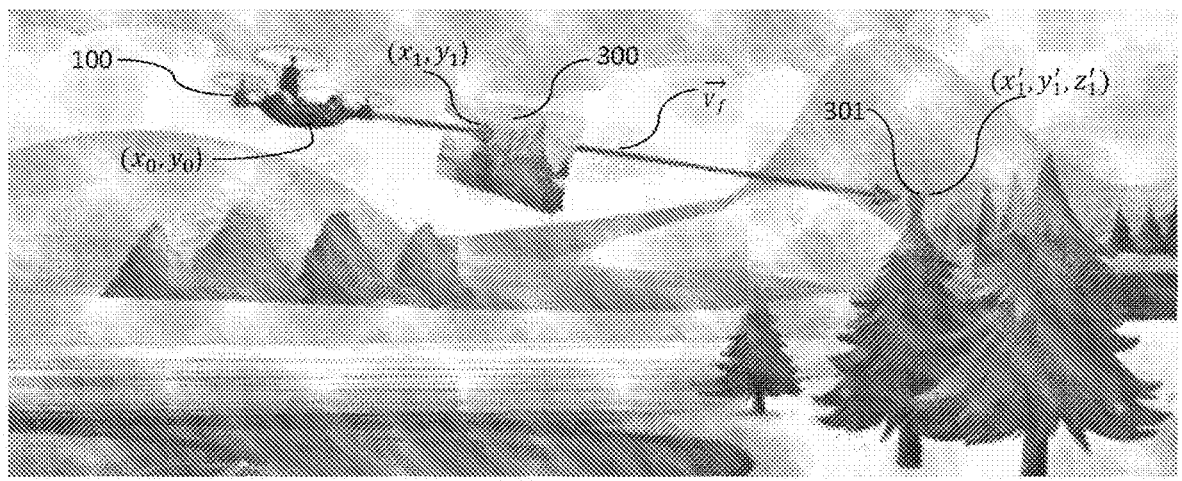
FIG. 3, is a schematic depicting the conversion from a rastered image to real physical space to establish continuously updating flight vector.

FIGS. 1, and 2, illustrate an exemplary implementation of the system's architecture and components applied to UAV 100 (here, a drone). As shown, The GCS (Ground station, CPM) 120 acts as a hub that interfaces between the user' "wants", and how the drone should behave. Being a user-independent translator means that the user has no direct control of the "flight model". The flight model developed by the system is configured to control the individual proportional, integral, and derivative gains (PIDs) which control the motors of drone 100 and are used to calculate and implement a correction to unwanted errors, such as those caused by redirecting the PoR on raster screen 300 (see e.g., FIG. 3). By automatically changing the values associated with the PID gains, flight direction can be corrected in flight.

Conversely, the user, or "pilot" can control drone 100 through various physical related layers, such as those shown in FIG. 2).

As indicated, the UXV can be a ground vehicle (UGV) an aerial vehicle (UAV), a marine vehicle (UMV), or a submersible vehicle (USV, both underground or under water). In an exemplary implementation, the vehicle is a UAV and the route plan is a flight plan, whereby to detect the marked destination, the set of executable instructions is configured, when executed, to cause the processor to: using a raster projection (in other words, the projection of a virtual ray from an object representing HMI 130, and/or user controller 131 over a two dimensional grid), receive a two dimensional (2D) coordinate value (x1, y1) from the HMI on display module 110; and translate the 2D coordinate value (x1, y1) to a three dimensional (3D) coordinate value (x1', y1' z1') in the 3D physical space. As indicated, the raster projection used to compute both the marking of the destination and the origin object location can be based on at least one of: a hand gesture analysis, and a six degrees of freedom (6 DOF) head and/or hand pose, meaning the user's head location relative to display module 110 in space, as well as the head pose in terms of pitch, yaw and roll, wherein display module 110 can further comprise analog camera(s) a single digital camera (e.g., RGB-D) and a plurality of digital cameras (or a combination of cameras comprising the foregoing), the at least one of the single digital camera and the plurality of digital cameras are each configured to capture at least one image of the user's head, and be able to isolate the user's eyes and determine a point of regard (PoR) corresponding to a single pixel on the display of display module 110.

Furthermore, to develop the flight plan, the set of executable instructions is configured, when executed, to cause the processor to: using the UAV's imaging module 102, detect the UAV's position in the 3D physical space coincident with the user marking of the destination on the display module (in other words, at the same time the user marks the desired destination on display module 110); compute a preferred approach angle (preferred angle) in the 3D physical space; and based on the preferred approach angle and using the onboard flight controller 103, compute a precise 3D Vector from UAV's 100 current position (x1, y1) to the translated 3D coordinates' value (x1', y1' z1').

Likewise, to maneuver UAV 100, the set of executable instructions is configured, when executed, to cause the processor of CPM 120 to: instruct the onboard flight controller 103 to maneuver UAV 100 to the vector's end point. Thus, upon marking of a new destination by the user on display module 110, the set of executable instructions is configured, when executed, to cause the processor to, again, obtain the current position coordinates (x1, y1), translate those to the 3D coordinates value (x1', y1' z'), calculate the flight vector and proceed accordingly, while compensating for environmental factors, such as thermals, head winds, obstacles and the like, while maintaining the desired velocity and angles. Accordingly, UAV 100 is configured to remain in flight so long as the new destination is marked on display module 110 by the user.

The implementation of the user experience (UX) and flight accuracy of the UXV is built upon a proprietary set of algorithms that allows to create both a static and progressive (machine learning, neural network) network of potentially endless sensors disposed on the UXV itself and potentially within the flight route, used to adjust and correct the accuracy, precision and resolution of the drone in infinitely complex real world environments, where each is characterized by different physical attributes such as light, texture, humidity, complexity, aerial pressure, physical barriers, shielding structures and so on. The fusion of the algorithm network is configured to gather and process the information gathered from the environment along the flight route and performs fusion & filtering and performs a prediction (estimation) of where it assess the UXV's location and projected transformation (speed vector)—And derives the necessary flight control commands needed to compensate between the requested location as well as speed vector; and the estimated mismatch (A) to that request. The algorithm networks can statically or dynamically improve the estimation by learning (dynamically) or configuring (statically) the weights (balance) between all active sensors to create the most accurate location and speed vector estimation. It is noted, that the adaptive (neural, machine learning) algorithms networks can physically reside on the UXV itself, on the GCS, or in the cloud, in other words, on a backend management server maintaining communication with the UXV, the HMI and the GCS.

The term "backend management server" (e.g., a host server), refer to a back-end hardware and software product that is used to manage content and communication and be accessed for example, when initiating communication between the field user's HMI (e.g., tablet, smartphone, VR goggles, or their combination), the backend management server can be configured to connect and retrieve requested data. "Content" (or "digital content" or "electronic content") refers generally to any and all types or formats of data or other information stored and/or transmitted electronically. Examples of content include, but are not limited to, a piece of software, a digital image, a piece of multimedia, flight control inputs, weather data, and the like. In an embodiment, the retrieved data can be previous sensors' threshold values, last predetermined target trajectory and the like.

Figure 5:
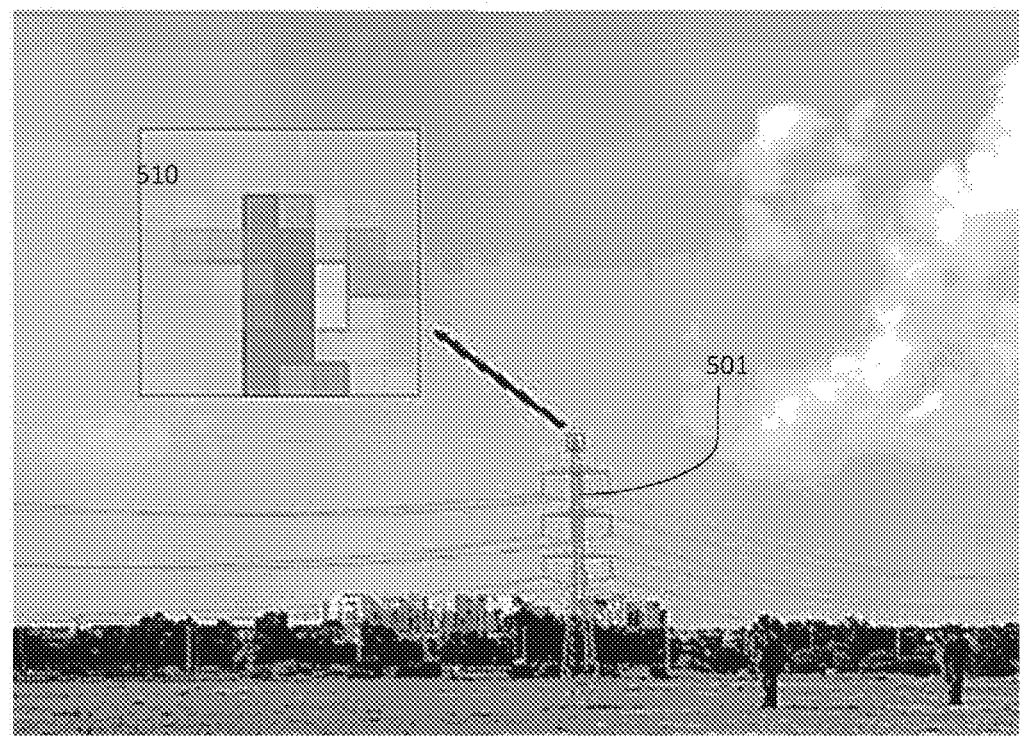
FIG. 5, illustrates an exemplary implementation for in-flight updating of the flight vector using optical flow.

For example, onboard flight controller 103 is configured to update and be updated of the marked destination with GCS at a frequency of between about 1 Hz and about 1 kHz, for example, 100 Hz. As illustrated in FIG. 5, in an exemplary implementation, during the flight, the imaging module would scan the environment and look for certain fiducials, such as high-tension wire poles and adjust the flight plan based on pixel density in the imaging module predetermined field of view (FOV), utilizing optical flow. Generally speaking, optical flow refers to the angular and/or translational rate of motion of texture in the visual field (FOV) resulting from relative motion between vision sensor 102 and other objects in the environment (see e.g. FIG. 5, high tension wire pole). In an example, using optical flow provides information about the distance, azimuth and elevation, which become determinate if the motion parameters are known, as well as recovery of target (e.g., the predetermined flight path).

Calculating optical flow difference, can be done by extracting feature points, or in other words, a predetermined parameter in a sequence of moving images (a "clip"), using, for example, a gradient-based approach, a frequency-based approach, a correlation-based approach, or their combination. For example, as shown in FIG. 5, in a gradient-based approach, a pixel point is found with a value that is minimized according to a variation of a peripheral pixel gray value and a variation of a gray value between image frames is then compared. In another example, in frequency-based approach, a differential value of all of pixel values in the image is utilized, by employing a band-pass filter for a velocity such as a Gabor filter. Conversely, correlation-based approach, is applied to a method of searching an object, while observed from the UXV in a sequence of images.

Figure 6:
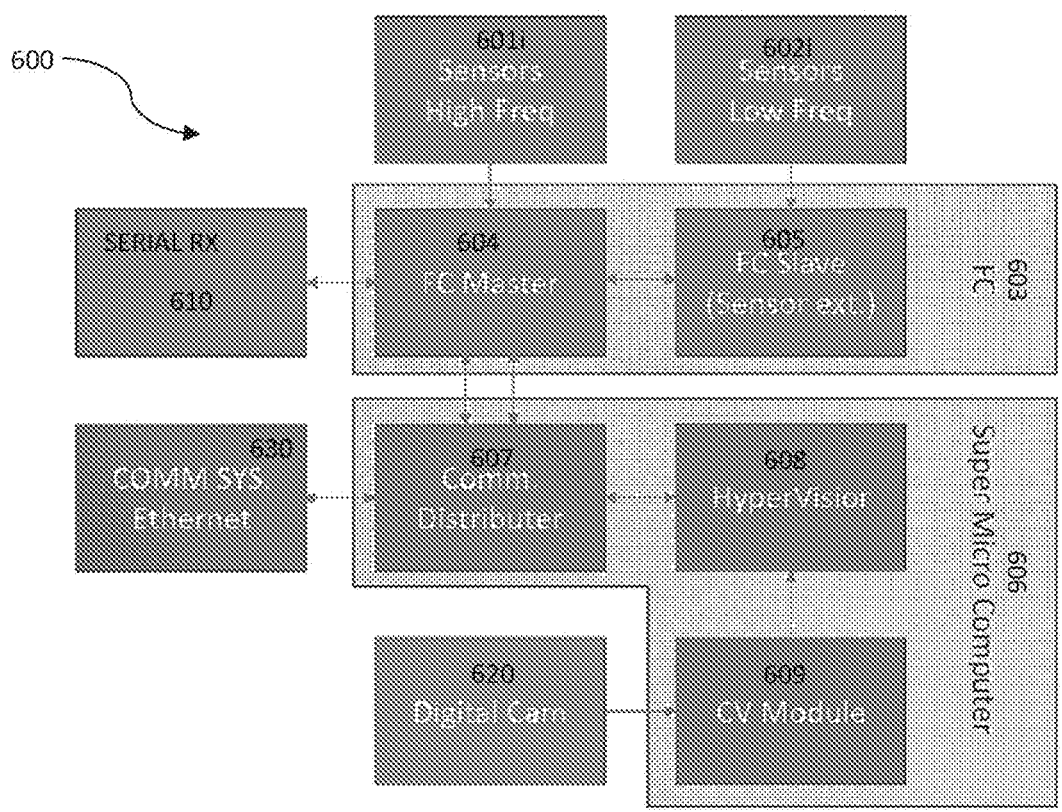
FIG. 6, shows an implementation of UXV architecture.

An example of a system architecture of a drone, operable with the systems, methods and programs (or computer products) disclosed herein, is illustrated in FIG. 6. As illustrated, the architecture 600, having various modules. For example, high (e.g., accelerometers, velocity, altitude sensors) and low frequency (e.g., temperature, pressure) (sensors 601i, 602i respectively), will input signals to flight control (FC) module 603, comprising master FC module 604 being in two-way communication with FC slave 605, transceiver 610 and communication hub 607 (e.g., mesh communication distributor), which resides on microcontroller 606, comprising in addition, the controller for the imaging module 608, as well as velocity controller (CV) module 609. As further illustrated, imaging module, 620 (e.g., a digital camera) is in two-way communication with CV 609, for example, to provide the optical flow data used in continuous flight vector updating.

Figure 7:
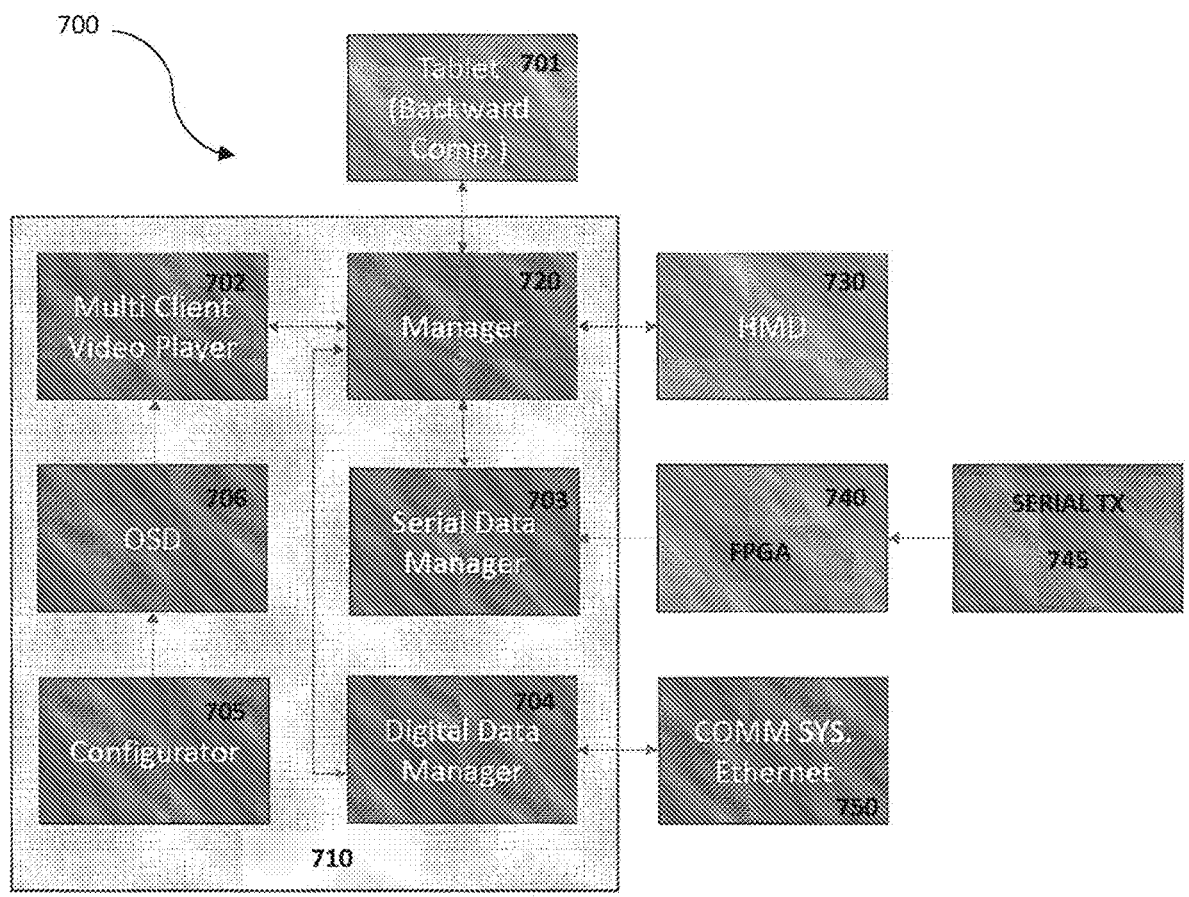
FIG. 7, shows an implementation of GCS architecture.

Likewise, FIG. 7, illustrates an exemplary implementation of the GCS module's architecture. As illustrated schematically, GCS module 700, can be comprised of several components, for example motherboard 710 (e.g., CAN bus, in two-way communication with a portable computing device 701 providing for example, display, connectivity and transceiver capabilities. Motherboard 710 is also in either one-way or two way communication with a head mounted display (HMD, e.g., VR goggles) 730, field programmable gate array (FPGA) 740, and communication hub, or edge router for mesh communication, in communication with a digital data manager module 704, forming a component of motherboard 710, with, in one implementation, Ethernet. FPGA 740, can be in further communication with transceiver 745, which can be the same or different that portable computing device 701, and further receive and provide flight control sensor interface. In addition to the digital data manager module 704, motherboard 710 can also comprise multi-client video player application 702, central processing unit 720, managing the motherboard, serial data manager comprising serial ports, such as: RS232, RS422 and RS485, each configured to increase the number of allowed devices connected simultaneously and increase speed and transmission distance. For example, RS232 enables the connection of 2 devices, RS422 enables unidirectional connection (in one direction) of 1 transmitter and up to 10 receivers (for receiving data from various transmitters on the UXV), and RS485 enables a bidirectional semiduplex connection, or bidirectional full-duplex with up to 32 sensors. Also shown is configurator 705, which can be an application processing interface enabling configuration of on-screen display module. Digital data manager, 704, can be used to synchronize with communication radar or sensor node 750 (see e.g., 140, FIG. 1).

In certain examples, the various modules (e.g., configurator 705), can advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The systems used herein can be computerized systems further comprising a central processing module; a display module; and a user interface module. The Display modules, which can include display elements, which may include any type of element which acts as a display. A typical example is a Liquid Crystal Display (LCD). LCD for example, includes a transparent electrode plate arranged on each side of a liquid crystal. There are however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

The term "computer-readable medium" as used herein, in addition to having its ordinary meaning, refers to any medium that participates in providing instructions to at least one processor for execution. Such a medium may take many forms, including but not limited to, non-volatile media and volatile media. Non-volatile media can be, for example, optical or magnetic disks, such as a storage device. Volatile media includes dynamic memory, such as main memory.

Memory device as used in the methods, programs and systems described herein can be any of various types of memory devices or storage devices. The term "memory device" is intended to encompass an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., the 3D inkjet printer provided), and/or may be located in a second different computer [or micro controller] which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stack(s) includes one or more stack). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Unless specifically stated otherwise, as apparent from the discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as the PoR into other data similarly represented as physical layers, such as the 2D transformed data.

Although the foregoing disclosure for systems, methods and programs for controlling maneuverability of unmanned vehicles (ground, aerial and marine) by coupling vehicle controls with point of regard (PoR) in a 2D plane (see e.g., FIG. 4), translated to a continuously updating flight vector in a 3D space by a 3D device, such as 6 DOF (or even a 12 DOF reference platform) user controller 131 and/or head mounted display (head tracking) 130 and/or gaze tracking, has been described in terms of some exemplary implementations, other operable implementations will be apparent to those of ordinary skill in the art from the disclosure herein. Moreover, the described exemplary implementations have been presented by way of example only to provide technical clarity, and are not intended to limit the scope of the operable implementations. Indeed, the novel methods, programs, and systems described herein may be embodied in a variety of other forms without departing from the spirit thereof. Accordingly, other combinations, omissions, substitutions and modifications will be apparent to the skilled artisan in view of the disclosure herein, while being covered in the claims.

Accordingly, provided herein is a system for directing an unmanned vehicle to a destination marked by a user comprising: a display module; an unmanned vehicle (UXV) comprising an imaging module, in communication with the display module; a human-machine interface (HMI) module in communication with the display module; and a central processing module (CPM), in communication with the display module, the UXV, the HMI module, and a processor, wherein the processor is in communication with a non-volatile memory comprising a processor-readable media having thereon a set of executable instructions, configured, when executed, to cause the processor to: using the HMI module, detect a destination marked by the user on the display module; develop a route plan for the UXV toward the destination in a three dimensional physical space; and persistently maneuver the UXV to the marked destination in the 3D physical space while simultaneously estimating the UXV's location in a complex environments, wherein (i) the UXV is an unmanned aerial vehicle comprising: the imaging module, in communication with the display module; an onboard flight controller; and a sensor array configured to maintain at least one of: a one-way, and two way communication with the CPM, wherein (ii) the HMI module is at least one of: a wearable computing device, and a remote controller, wherein (iii) the route plan is a flight plan, and wherein to detect the marked destination, the set of executable instructions is configured, when executed, to cause the processor to: using a raster projection, receive a two dimensional (2D) coordinate value from the HMI on the display module; and translate the 2D coordinate value to a three dimensional (3D) coordinate value in the 3D physical space, wherein (iv) to develop the flight plan, the set of executable instructions is configured, when executed, to cause the processor to: using the UAV's imaging module, detect the UAV's position in the 3D physical space coincident with the user marking of the destination on the display module; compute a preferred approach angle in the 3D physical space; based on the preferred approach angle and using the onboard flight controller, compute a precise 3D Vector from the UAV's current position to the translated 3D coordinates' value; and Continually estimate and assess mismatch between estimated position and speed and the real position and speed of the UAV, performing sensor fusion and estimation, and continuously correcting the flight path to match the predetermined flight vector and speed, wherein (v) to persistently maneuver the UAV, the set of executable instructions is configured, when executed, to cause the processor to: instruct the onboard flight controller to maneuver the UAV along the computed vector, wherein (vi) upon marking of a new destination by the user, the set of executable instructions is configured, when executed, to cause the at least one processor to repeat the steps disclosed hereinabove, (vii) the UAV is configured to remain in flight so long as the new destination is marked on the display module, wherein (viii) the onboard flight controller is configured to update the marked destination at a frequency of between about 1 Hz and about 1 kHz, wherein (ix) the raster projection is based on at least one of: a hand gesture analysis, and a six degrees of freedom head pose analysis, and wherein (x) the display module comprises at least one of: an analog camera, a single digital camera and a plurality of digital cameras, the at least one of the single digital camera the analog camera and their combination, and the plurality of digital cameras are each configured to capture at least one image of the user's eyes and determine a point of regard (PoR) corresponding to a single pixel.

In another embodiment, provided herein is a processor readable program, configured when executed, to cause at least one processor to: using a human-machine interface (HMI) module in communication with a display module module, detect a destination of an unmanned vehicle (UXV) comprising an imaging module, in communication with a display module, the destination marked by a user on the display module; develop a route plan for the UXV toward a predetermined destination in a three dimensional physical space; and persistently maneuver the UXV to the user-marked destination in the 3D physical space, while simultaneously estimate the UXV's location in a complex environments, wherein (xi) the route plan is a flight plan, and wherein to detect the user marked destination, the set of executable instructions is configured, when executed, to cause the at least one processor to: using a raster projection, receive a two dimensional (2D) coordinate value from the HMI on the display module; and translate the 2D coordinate value to a three dimensional (3D) coordinate value in the 3D physical space, wherein (xii) to develop the flight plan, the set of executable instructions is configured, when executed, to cause the processor to: using the UAV's imaging module, detect the UAV's position in the 3D physical space coincident with the user marking of the destination on the display module; compute a preferred approach trajectory in the 3D physical space; based on the preferred approach angle and using the onboard flight controller, compute a precise 3D Vector from the UAV's current position to the translated 3D coordinates' value commensurate with the computed preferred approach trajectory; continually estimate and assess mismatch between estimated position and speed and the real position and speed of the UAV, performing sensor fusion and estimation; and continuously correct the flight path to match the predetermined flight vector and speed commensuration with the preferred approach trajectory, wherein (xiii) to persistently maneuver the UAV, the set of executable instructions is configured, when executed, to cause the at least one processor to: instruct the onboard flight controller to maneuver the UAV along the computed vector While the invention has been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

What is claimed:
1. A system for directing an unmanned vehicle to a destination marked by a user, the system comprising:
  a) a display module;
  b) an unmanned aerial vehicle (UAV) comprising:
    i. an imaging module in communication with the display module;
    ii. an onboard flight controller, and
    iii. a sensor array configured to maintain at least one of a one-way or two-way communication with a central processing module (CPM);
  c) a human-machine interface (HMI) module in communication with the display module, wherein the HMI module is at least one of a wearable computing device or a remote controller, and
  d) the CPM is in communication with the display module, the UAV, the HMI module, and a processor in communication with a non-volatile memory comprising a processor-readable media having thereon a set of executable instructions that are configured, when executed, to cause the processor to:
    i. using a raster projection, receive, from the HMI on the display module, a two-dimensional (2D) coordinate value representing the destination marked by the user;
    ii. translate the 2D coordinate value to a three-dimensional (3D) coordinate value of the destination marked by the user in a 3D physical space;
    iii. using the UAV's imaging module, detect the UAV's current position in the 3D physical space coincident with the user marking of the destination on the display module;
    iv. compute a preferred approach angle in the 3D physical space from the UAV's current position to the 3D coordinate value of the destination marked by the user;
    v. based on the preferred approach angle and using the onboard flight controller, compute a 3D vector from the UAV's current position to the 3D coordinate value of the destination marked by the user;
    vi. use optical flow data, including a rate of motion of a texture in the raster projection, for continuous flight vector updating to correct the flight path to match the 3D vector and real speed of the UAV, and
    vii. maneuver the UAV to the 3D coordinate value of the destination marked by the user in the 3D physical space while simultaneously estimating the UAV's position in an environment.

2. The system of claim 1, wherein to maneuver the UAV, the set of executable instructions is configured, when executed, to cause the processor to instruct the onboard flight controller to maneuver the UAV along the computed 3D vector.

3. The system of claim 1, wherein, upon marking of a new destination by the user, the set of executable instructions is configured, when executed, to cause the at least one processor to:
  i. receive a second two-dimensional (2D) coordinate value from the HMI on the display module;
  ii. translate the second 2D coordinate value to a second three-dimensional (3D) coordinate value in the 3D physical space;
  iii. using the UAV's imaging module, detect the UAV's current position in the 3D physical space;
  iv. compute a second preferred approach angle in the 3D physical space;
  v. based on the preferred approach angle and using the onboard flight controller, compute a second 3D vector from the UAV's current position to the 3D coordinate value;
  vi. estimate and assess mismatch between the estimated position and speed and the real position and the real speed of the UAV, performing sensor fusion and estimation, and correcting the flight path to match the second 3D vector and the real speed, and
  vii. maneuver the UAV to the second 3D coordinate value of the marked destination in the 3D physical space while simultaneously estimating the UAV's position in the environment.

4. The system of claim 3, wherein the UAV is configured to remain in flight so long as the new destination is marked on the display module.

5. The system of claim 1, wherein the onboard flight controller is configured to update the marked destination at a frequency of between 1 Hz and 1 KHz.

6. The system of claim 1, wherein the raster projection is based on at least one of a hand gesture analysis or a six-degrees-of-freedom head pose.

7. The system of claim 2, wherein the display module comprises at least one of an analog camera, a single digital camera, or a plurality of digital cameras, the single digital camera, the analog camera, the combination of the single digital camera and the analog camera, or the plurality of digital cameras, are each configured to capture at least one image of the user's eyes and to determine a point of regard (POR) corresponding to a single pixel.

8. A computer-readable medium storing a set of executable instructions configured, when executed by at least one processor, to cause the at least one processor to:

a) using a human-machine interface (HMI) module in communication with a display module, an onboard flight controller, and a sensor array configured to maintain at least one of a one-way, or two-way communication with the at least one processor, detect a destination of an unmanned aerial vehicle (UAV) comprising an imaging module in communication with the display module, the destination marked by a user on the display module wherein, to detect the user-marked destination, the set of executable instructions is configured, when executed, to cause the at least one processor to:
  i. using a raster projection, receive a two-dimensional (2D) coordinate value from the HMI on the display module; and
  ii. translate the 2D coordinate value to a three-dimensional (3D) coordinate value in a 3D physical space;
b) develop a flight plan for the UAV toward a predetermined destination in the 3D physical space, wherein to develop the flight plan, the set of executable instructions is configured, when executed, to cause the at least one processor to:
  i. using the UAV's imaging module, detect the UAV's current position in the 3D physical space coincident with the user marking of the destination on the display module;
  ii. compute a preferred approach trajectory in the 3D physical space from the UAV's current position to the 3D coordinate value in the 3D physical space;
  iii. based on the preferred approach trajectory and using the onboard flight controller, compute a 3D flight vector from the UAV's current position to the translated 3D coordinate value commensurate with the computed preferred approach trajectory;
  iv. use optical flow data, including a rate of motion of a texture of the raster projection, for continuous flight vector updating to correct the flight path to match the predetermined 3D flight vector and the real speed of the UAV commensurate with the preferred approach trajectory; and
c) maneuver the UAV to the 3D coordinate value of the user-marked destination in the 3D physical space while simultaneously estimating the UAV's position in an environment.

9. The computer-readable medium of claim 8, wherein to maneuver the UAV, the set of executable instructions is configured, when executed, to cause the at least one processor to instruct the onboard flight controller to maneuver the UAV along the computed 3D flight vector.

10. The system of claim 1, wherein the use of optical flow data for continuous flight vector updating to correct the flight path to match the 3D vector and real speed of the UAV comprises:
calculating optical flow difference by extracting feature points as predetermined parameters in a sequence of moving images.

11. The system of claim 10, wherein the calculating optical flow difference by extracting feature points as predetermined parameters in a sequence of moving images comprises:
imaging module scanning of the environment for one or more fiducials, and adjusting the flight plan based on pixel density in an imaging module predetermined field of view.

12. The system of claim 10, wherein the calculating optical flow difference by extracting feature points as predetermined parameters in a sequence of moving images comprises:
using at least one of a gradient-based approach, a frequency-based approach, or a correlation-based approach.

13. The system of claim 12, wherein the gradient-based approach comprises:
evaluating one or more pixel points with a value that is minimized according to a comparison of a variation of a peripheral pixel gray value and a variation of a gray value between image frames.

14. The system of claim 12, wherein the frequency-based approach comprises:
using a differential value of all pixel values in the image by employing a band-pass filter for a velocity.

15. The system of claim 14, wherein the band-pass filter comprises a Gabor filter.

16. The system of claim 12, wherein the correlation-based approach comprises:
searching for an object observed from the UAV in a sequence of images.

17. The system of claim 1, wherein the use of optical flow data for continuous flight vector updating comprises:
using optical flow to provide information about at least one of distance, azimuth, or elevation.

18. The system of claim 1, wherein the rate of motion of the texture includes an angular rate of motion of the texture.

19. The system of claim 1, wherein the rate of motion of the texture includes a translational rate of motion of the texture.

* * * * *